Patented Dec. 30, 1952

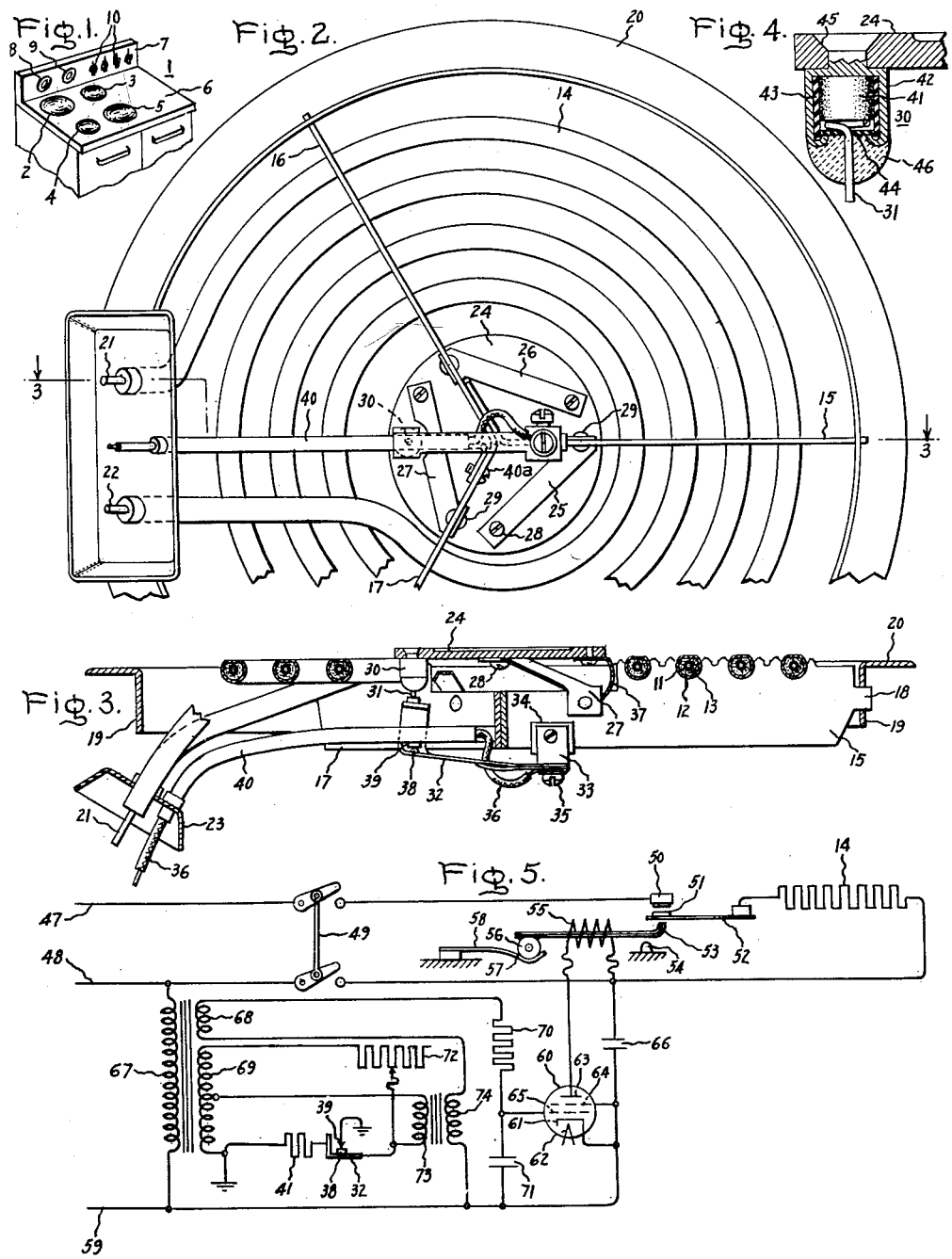

2,623,976

UNITED STATES PATENT OFFICE 2,623,976

AUTOMATIC ELECTRIC RANGE CONTROL

George N. Miles, Orangeburg, N. Y., assignor to General Electric Company, a corporation of New York Application December 24, 1949, Serial No. 135,013

2 Claims. (Cl. 219—20)

This invention relates to automatically controlled heating devices, and more particularly to surface heating units for cooking appliances with an automatic temperature control.

A primary object of my invention is to provide an adjustable automatic temperature control for a surface heating unit so that a cooking utensil may be placed on the heating unit and heated to a predetermined temperature, which temperature is maintained until the unit is shut off. More specifically, my control arrangement is adapted to regulate the input to an electric heating unit in response to the temperature of a cooking utensil placed thereon.

A further object of my invention is to arrange a temperature control for a heating unit of a range, adapted to be calibrated in cooking operations as well as in temperatures, which functions to maintain a cooking utensil at the proper temperature for any preselected operation.

Another object of my invention is to provide a heating device and control therefor which is operative to supply heat to a cooking utensil only when such utensil rests on the heating device.

Still another object of my invention is to construct an automatic temperature control for a cooking appliance which is sufficiently rugged to withstand continued normal use and can be produced at a manufacturing cost commensurate with nonautomatic temperature controlling arrangements now commonly employed for electric ranges and the like.

In accomplishment of the foregoing objectives, a feature of my invention consists in mounting a resistance element having a high temperature coefficient of resistance in a position with respect to a heating device so that it is always in intimate thermal contact with a cooking utensil placed on the heater, thus permitting the resistance element to measure the effective temperature of the cooking utensil. This mounting of the temperature sensitive resistor also serves to permit energization of the heating unit only when a cooking utensil is resting thereon. Another feature of my invention comprises the control for switching on and off the heating device automatically in response to the changes in resistance of the temperature sensitive element. For this purpose, the temperature sensitive resistance and an adjustable resistance are connected together in a bridge circuit, the output of which controls conduction through a gaseous discharge device. When the gaseous discharge device becomes conducting, power is supplied to a small heater to actuate a temperature responsive switch in the circuit of the heating device.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a perspective view of an electric range; Fig. 2 is an enlarged bottom view of one of the surface heating units; Fig. 3 is a cross-sectional view taken on the line 3—3 of Fig. 2; Fig. 4 is an enlarged cross-sectional view of a detail; and Fig. 5 is a diagrammatic view of the various components and electrical connections.

The present invention is particularly adapted for use in conjunction with surface heating units of an electric range, generally of the type illustrated by Fig. 1. I do not wish to be limited solely to this one application of my invention, however, since the control arrangement disclosed and claimed herein may find many other applications in various types of heating devices and electric heating units. Referring now to Fig. 1, the electric range 1 is provided with a plurality of heating units 2, 3, 4, and 5 mounted in a horizontal plane slightly above the main working surface 6 on the top of the stove. A suitable back splash panel 7 provides a convenient location for temperature control adjustments and switches. In this particular embodiment, a pair of suitable knob and dial assemblies 8 and 9 provide convenient adjustment for automatic temperature control of heating units 2 and 3, respectively. The remaining control knobs 10 are of the conventional type to control the supply of power to surface heating units 4 and 5 and to regulate the heating unit within an oven provided within the range.

Figs. 2 through 5 and the corresponding description following disclose an automatic temperature control arrangement and heating unit corresponding to either one of the surface heating units 2 or 3 shown in Fig. 1. It is to be understood, of course, that such an automatic control arrangement may be incorporated as a part of any one or more of the surface heating units, although in Fig. 1, by way of example, I have shown such automatic control for only two of the four units.

A heating unit of the preferred form is shown in Figs. 2 and 3 as comprising a helical resistance conductor 11 mounted within an outer metallic sheath 12 and supported in spaced relation with reference to the outer sheath by an electrically insulating heat conducting mass 13, such as highly compressed granulated magnesium oxide. This particular form of the heating element itself forms no part of the present invention, it being understood that my invention is equally applicable to other types of heating units and devices. As here shown, a completed heating unit 14 is arranged in the form of a spiral with the turns supported in spaced relation on a plurality of supporting arms, such as 15, 16, and 17. The ends of the supporting arms which meet centrally of the heating unit may be connected together in any suitable manner, such as shown in Fig. 2. The outer end of each of the supporting arms includes an ear, such as 18, adapted to project through an aperture in a downwardly depending portion 19 of an annular flanged member 20. Flanged member 20 in turn rests on the main working surface 6 of the stove, thus rigidly supporting the heating unit so that it is adapted to carry the weight of any cooking utensil placed therein. The end terminals 21 and 22 of the heating unit extend downwardly through a protective shield 23. Any suitable arrangement may be employed for connecting incoming electrical supply lines (not shown) to the terminals 21 and 22.

The temperature of any cooking utensil placed on heating unit 14 is measured and controlled, in accordance with this invention, by a heat sensitive device 30 situated so as to be responsive to the temperature of such cooking utensil. For this purpose, I provide a disk 24 resiliently mounted centrally within the heating unit to extend normally slightly above the plane of the heating element. As shown in Figs. 2 and 3, disk 24 is supported by a plurality of leaf springs 25, 26, and 27 attached thereto at spaced points by any suitable means, such as threaded fastening devices 28. The opposite ends of these spring members are attached to supporting arms 15, 16, and 17, respectively, by rivets 29, or other suitable devices. While this spring mounting for disk 24 normally holds it slightly above the plane of the top of the heating element, whenever a vessel or other object of appreciable weight is placed on the heating unit, the spring mounting permits a depression of disk 24 so that it is coplanar with the top surface of the heating element. Therefore, disk 24 is always in good thermal contact with the bottom surface of any cooking vessel or utensil placed on the heating unit. Preferably, disk 24 is of material which is highly conductive both thermally and electrically. Materials such as copper and aluminum are particularly suitable for this purpose.

The assembled heat sensitive device 30, as shown in Figs. 2 and 3, preferably is attached adjacent the outer edge of disk 24 extending downwardly from its under surface. One of the terminals 31 for the heat sensitive device is permanently attached to an end of a resilient contact arm 32, which in turn is secured to supporting arm 15 of the frame by a bracket 33. Bracket 33 is electrically isolated from the frame through the use of an insulating plate 34. The attachment of contact arm 32 to the bracket by the use of a screw 35 also serves as a terminal connection for a control lead 36. The other terminal for heat sensitive device 30 is provided by a ground connection to the frame of the range itself. To insue a good electrical circuit from the range frame to disk 24 and hence the heat sensitive device, it may be desirable to include a flexible electrically conducting lead 37 having one of its ends connected to supporting arm 15 and its other end secured to disk 24. Contact arm 32 carries a movable contact point 38 adapted to engage a fixed contact point 39 attached in a suitable manner to the frame of the range. Referring to Fig. 2, it may be noted that the control lead 36 includes an outer metallic sheath 40, which sheath is grounded to supporting arm 17 at 40a. This grounding connection, or the rigid sheath 40, provides a suitable location for mounting of fixed contact 39. Contacts 38 and 39 are normally closed when there is no cooking utensils resting on disk 24. Thus both terminals of the temperature sensitive device 30 are grounded, for a purpose which will become apparent at a later point. However, when a cooking vessel is placed on the heating unit so as to depress disk 24, contacts 38 and 39 are separated whereby one of the terminals of the heat sensitive device is provided through the ground connection and the other terminal is provided by the connection to control lead 36, through contact arm 32.

Details of heat sensitive device 30 are shown in Fig. 4. The thermally sensitive element itself is here shown as a cylinder 41 supported within an outer protective metallic sheath or housing 42. The primary prerequisite for thermally sensitive element 41 is that its resistance must change greatly over the operating range of temperatures employed. For example, in this particular application, the range of temperatures desirable is from approximately 150 degrees F., for warming operations, to 400 degrees F., for griddling operations. I have found that a change of resistance from 500 ohms to 20 ohms over this temperature range provides a very satisfactory and reliable control. Furthermore, this element must be capable of withstanding accidental overheating to temperatures as high as 1000 degrees F. It is also desirable, of course, that the assembled heat sensitive device be capable of withstanding the various mechanical shocks to which it is subjected during normal usage. In view of these various requirements, I find a thermistor particularly satisfactory for the thermally sensitive element 41, and hereinafter element 41 will be referred to as a thermistor. By this term is meant any resistance element having a resistance which varies greatly with changes in temperature. As shown in Fig. 4, the thermistor is insulated on its outer cylindrical surface by an insulating sleeve 43 and on its bottom surface by a disk 44. Preferably insulation 43 and 44 is of a material, such as mica, not readily affected by the higher temperatures here involved. The top surface of the thermistor is in direct contact with the metallic housing 42. In addition, housing 42 may include a head portion adapted to be riveted in position in an aperture 45 provided in disk 24. The lower edge of the housing 42 is rolled inwardly to compress insulating disk 44 and the upper portion of a terminal wire 31 against the bottom surface of the thermistor. The assembled device may be completely sealed with a suitable molded ceramic material 46, as shown in Fig. 4. With this construction, it is apparent that one of the terminals of the thermistor comprises the outer metallic housing 42 and disk 24, which in turn are electrically connected to the frame of the range. The other end terminal for the thermistor is formed by the conductor 31. With this construction and orientation of thermistor 41, it may be seen that it is thermally sensitive to the temperature of disk 24, which in turn is pressed against the bottom of any cooking utensil placed thereon. Hence, the thermistor is principally sensitive to the temperature of such cooking utensil. However, in addition, it is preferred to mount the assembled device 30 near the outer edge of disk 24 so that it is also subjected to radiant heat from the inside turns of the heating element itself. In many cooking operations, it is found that the temperature of the heating element rises much more rapidly than the temperature of the cooking utensil or its contents. In addition, the heating element, because of its inherent mass, stores a considerable amount of heat, so that even after the heating element is shut off, the residual heat causes a rise in the temperature of the cooking utensil. The net result then is an overshoot of the desired temperature. However, by the orientation of the heat sensitive device as illustrated in Figs. 2 and 3, the radiant heat from the heating element results in the thermally sensitive device reaching its predetermined temperature slightly prior in time to the reaching of the same predetermined temperature by the cooking vessel. This arrangement then functions to terminate the supply of power to the heating element slightly before the desired temperature is reached, whereby the residual heat stored in the heating element permits a coasting effect ending in approximately the desired temperature of the cooking vessel.

In view of the above, it is apparent that temperature control is achieved in response to the change of resistance of thermistor 41 upon change in temperature. The circuits and elements comprising the control which switch the heating unit on and off in response to temperature change are shown in Fig. 5. In this diagrammatic view, the main heating element 14 is adapted to be connected across a power supply comprising the conductors 47 and 48. An appropriate two-pole single-throw line switch 49 may be provided in this circuit so that the heating unit may be manually disconnected. In addition, this circuit contains another switch including a fixed contact 50 connected to supply line 47 and a movable contact 51 carried on a resilient contact arm 52, which is connected to one of the terminals of the heating unit. The other terminal of heating unit extends through one pole of switch 49 to power supply conductor 48. Thus, with the line switch 49 closed, a closure of contacts 50 and 51 places full line voltage, for example 220 volts, across the heating unit so that it is effective to supply heat to any cooking utensil placed on the surface of the unit.

Contacts 50 and 51 are normally open, but are adapted to be closed by the heat responsive motion of a bimetallic strip 53, the free end of which is movable between a fixed stop 54 and the outer side of contact arm 52. It is to be understood that bimetallic element 53 is to be placed at any convenient point remote from the main heating element, so that it moves to operate contacts 50 and 51 only in response to heat supplied by its own heater 55. Preferably, heater 55 is coiled around the body of the bimetallic strip itself so that only a small power dissipation is required to heat the bimetallic element sufficiently to close contacts 50 and 51. To obtain prompt responsive action of the bimetallic element, it is preferred to support its fixed end on a friction loaded pivot. As here shown, the fixed end of the bimetal has attached thereto a centrally apertured cylindrical member 56. The central aperture permits member 56 to be supported on a fixed bearing pin about which the bimetallic element may rotate. To limit this rotation, a frictional surface 57 is prepared on the end of a resilient arm 58 attached in any suitable manner to a fixed supporting surface. This frictional engagement of surface 57 with the outer surface of cylindrical member 56 tends to restrain the pivotal movement of the bimetallic element. Therefore, when the heater is energized, the initial heat responsive motion of the bimetallic element consists only in a movement of the free end in a direction to close contacts 50 and 51. However, once the contacts have been closed and the desired contact pressure is reached, further heat responsive motion of the bimetallic element is in the nature of a pivotal movement of its fixed end about the axis of member 56. Thereafter, when the heating element 55 is no longer energized, cooling of the bimetallic element results in an early opening of contacts 50 and 51 without waiting for the bimetallic element to return to its initial position. As the bimetallic element continues to cool, its free end abuts against stop 54, followed eventually by a pivotal movement of the fixed end of the bimetallic element. It is, therefore, seen that the addition of the friction loaded pivot materially decreases the response time for opening or closing the contacts upon cooling or heating of the bimetallic element.

To control the supply of power to bimetallic element heater 55, a suitable gaseous discharge device 60, such as a thyratron, is employed. This circuit may be traced from a neutral 59 of the power supply through the plate circuit of the thyratron, heater 55, to line 48. Thus, whenever the thyratron is conducting, heater 55 is energized tending to close contacts 50 and 51. Thyratron 60 is of a conventional type including a cathode 61, cathode heater 62, anode 63, shield grid 64, and control grid 65. A capacitor 66 is connected across supply lines 48 and 49 to suppress spurious radiation that causes noise in radio receivers.

Control grid 65 fires the thyratron or causes it to conduct whenever the resistance of the thermistor is at a high value corresponding to a low temperature. This is assuming that the temperature coefficient of resistance of the thermistor is negative. However, it is obvious that the circuit could be arranged to accomplish the same effect with a thermistor having a high positive coefficient of resistance. The desired result in each case requires that the contacts 50 and 51 be closed at such time as the temperature of the thermistor is below the desired temperature and open when the predetermined temperature has been reached. In the present embodiment, it is assumed that thermistor 41 has a negative temperature coefficient.

Referring again to Fig. 5, the control voltage used in the thermistor circuit is stepped down through the use of a transformer having its primary 67 connected between lines 48 and 59 and having two secondaries 68 and 69. Transformer secondary 68 provides a suitable initial bias for control grid 65. Resistor 70 and capacitor 71 are provided to shift the phase relation between the grid voltage and the plate voltage to achieve proper operating conditions. Transformer secondary 69 is center-tapped for connection with the thermistor 41 and an adjustable resistor 72 in a bridge circuit having a primary 73 of a second transformer connected across the bridge output. Preferably transformer primary 69 is a low voltage secondary, for example in the neighborhood of 6 volts, so that it may also be used as a filament transformer for the thyratron. Furthermore, the use of such a low voltage permits grounding of one of the transformer terminals and grounding of one of the terminals of the thermistor as described above. Hence, only a single control lead to the thermistor is required. Adjustable resistor 72 may be located at any convenient point within the stove, although preferably it is placed behind the backsplash panel to permit its adjustment by one of the controlling members 8 or 9, shown in Fig. 1. The variation in resistance values of the adjustable resistor is selected to be of substantially the same range of resistance values as pertain to the thermistor over the operating temperature range. When the resistance of the thermistor and that of the adjustable resistor 72 are the same, or which at least are so proportioned that the bridge including these two elements and the center-tapped transformer secondary 69 is balanced, there is no voltage across the transformer primary 73. Under these conditions, the control grid is biased by transformer secondary 68, resistor 70, and capacitor 71 to the critical cutoff control grid voltage for the thyratron. However, if at any time the resistance of the thermistor 41 increases so that the bridge becomes unbalanced, a potential is applied across primary 73, which voltage is amplified by the transformer secondary 74. This voltage across transformer secondary 74 causes a phase and magnitude shift of the voltage applied to control grid 65 to cause the thyratron to fire and hence supply power to heater 55.

As may be seen from Fig. 5, whenever contacts 38 and 39 are closed, thermistor 41 is short-circuited producing the effect of a very low thermistor resistance. In the bridge circuit, such a low thermistor resistance occurring when it is thus short-circuited corresponds to the same effect which would exist if the temperature of the thermistor were very high. The resulting unbalance of the bridge is reflected through transformer primary 73 and secondary 74 in a direction and phase to bias the control grid well beyond the critical cutoff valve for the thyratron. Hence, with contacts 38 and 39 closed, the thyratron cannot conduct and hence the contacts 50 and 51 in the range heater circuit are open. When a cooking utensil or other object is placed on the heating unit, disk 24 is depressed separating contact 38 from contact 39. Thereafter, the thermistor is no longer short-circuited and its resistance is effective for controlling temperature.

The movable contact for adjustable resistor 72 may be adjusted in any suitable manner, although preferably adjustment is accomplished by one of controls 8 or 9 on the backsplash panel of the stove, with suitable calibrations so that the movable knob may be positioned to the desired temperature setting. Thereafter, when a cooking utensil is placed on the heating unit, full power is applied across its terminals causing it to heat. Shortly before the preselected temperature is reached, the thermistor resistance has dropped to such a value that the bridge circuit is balanced. At this point, the bias on the control grid prevents further conduction through the thyratron to heater 55 on the bimetallic strip. Upon the resultant cooling of the bimetallic strip, contacts 50 and 51 open the circuit to the main heating unit. Thereafter, as the temperature of the thermistor falls below the desired value, the bridge is again unbalanced to fire the thyratron and effect a reclosure of contacts 50 and 51. A cycling effect thus takes place automatically energizing and de-energizing the main heating element to hold the temperature of the cooking utensil within a ten or fifteen degree range of the set temperature. Obviously, the adjustable resistor control could equally well be calibrated in cooking operations rather than in degrees F. For example, a warming operation would correspond to approximately 150 degrees F.; boiling would correspond to a temperature of approximately 215 degrees F.; and griddling would correspond to a temperature of substantially 400 degrees F. In any event, the cooking utensil is held at the set temperature until such time as the utensil is removed or line switch 49 is opened. As explained above, removal of the cooking utensil alone serves to automatically terminate operation of the main heating element.

From the above, it is apparent that the physical location of the thermally sensitive device 30 is of importance since it must be oriented to be thermally responsive to the temperature of disk 24 and the cooking utensil and secondarily responsive to radiated heat from the heating element itself. The position or physical arrangement of the remaining circuit elements for the heating unit control is a matter of choice and expediency, so long as these elements are in a protected location not unduly influenced by any of the heating units employed for the range. It is pointed out, however, that certain physical arrangements may be employed to advantage. For example, the means for adjusting variable resistor 72 may quite conveniently embody an arrangement for operation of the two-pole line switch 49. The desired arrangement then may have an off position for the manual temperature setting device 8 or 9 which serves to open switch 49 and simultaneously disconnect the variable element from resistor 72. Such an arrangement is preferable since filament 62 of the gaseous discharge device should normally remain energized at all times so that it is instantly ready for operation. Obviously, a suitable manually controlled switch may be employed through which the tube filament can be de-energized prior to long periods of non-use.

From the above description, it may be seen that I have provided an electric heating device, particularly suitable for cooking purposes, with adjustable temperature control which functions to maintain an even temperature of any vessel placed on the heating device. The portion of the control which must be placed physically adjacent the heating device itself, namely the thermally sensitive element, does not include any moving parts which may be fouled by dirt or other substance. With this arrangement, a cooking operation may be commenced merely by setting a control to the desired or predetermined temperature and placing a cooking utensil on the heating unit. Thereafter, the heating unit automatically turns on to raise the cooking utensil to the desired temperature. Once this temperature has been reached, thereafter the control periodically turns the heating element on and off to maintain the temperature continuously within narrow limits.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a cooking appliance, an electric heating unit comprising a plurality of spaced apart spiral turns, the innermost turn defining a central opening, a disk positioned in said opening for engagement with the bottom of a cooking vessel placed on the heating unit, said disk being formed from a material of high heat conductivity and occupying substantially the entire area of said opening whereby its edge is directly adjacent to the innermost spiral turn, a thermistor mechanically connected to and in direct thermal contact with said disk and off-center thereof adjacent to its edge and thereby adjacent to said innermost spiral turn whereby it is subjected to heat from said disk and to heat directly from said innermost spiral turn, an electric switch controlling flow of current to said electric heating unit, an electric circuit including said thermistor, and means controlled by variations in the resistance of said thermistor for effecting operation of said switch.

2. In a cooking appliance, an electric heating unit comprising a plurality of spaced apart spiral turns, the innermost turn defining a central opening, a disk positioned in said opening for engagement with the bottom of a cooking vessel placed on the heating unit, said disk being formed of a material of high heat conductivity and occupying substantially the entire area of said opening whereby its edge is directly adjacent to said innermost spiral turn, vertically yielding means supporting said disk above the plane of said heating unit and depressed by the weight of a cooking vessel placed on the unit, a thermistor mechanically connected to, depending from, and in direct thermal contact with said disk and off-center thereof adjacent to its edge and thereby adjacent to said innermost spiral turn whereby it is subjected to heat from said disk and to heat directly from said innermost spiral turn, an electric switch controlling flow of current to said electric heating unit, an electric circuit including said thermistor, means controlled by variations in the resistance of said thermistor for effecting operation of said switch, and a switch in said electric circuit actuated by movement of said disk for rendering said circuit inoperative when said disk is in its raised position.

GEORGE N. MILES.

REFERENCES CITED

The following references are of record in the file of this patent:

UNITED STATES PATENTS

| Number | Name | Date |
|---|---|---|
| 1,914,192 | Bedford | June 13, 1933 |
| 2,207,871 | Myers | July 16, 1940 |
| 2,236,624 | Littwin | Apr. 1, 1941 |
| 2,288,510 | Brannon | June 30, 1942 |
| 2,303,012 | Weber et al. | Nov. 24, 1942 |
| 2,352,056 | Wilson | June 20, 1944 |
| 2,373,160 | Bollman et al. | Apr. 10, 1945 |
| 2,399,423 | Bletz | Apr. 30, 1946 |
| 2,404,643 | Livingston | July 23, 1946 |
| 2,427,945 | Clark | Sept. 23, 1947 |
| 2,436,735 | Walder et al. | Feb. 24, 1948 |
| 2,490,965 | Huck | Dec. 13, 1949 |
| 2,510,040 | Rudahl | May 30, 1950 |
| 2,510,041 | Rudahl | May 30, 1950 |
| 2,552,480 | Dickey | May 8, 1951 |
| 2,602,132 | Young | July 1, 1952 |